United States Patent
Günther et al.

(10) Patent No.: US 11,120,690 B2
(45) Date of Patent: Sep. 14, 2021

(54) METHOD AND DEVICE FOR PROVIDING AN ENVIRONMENTAL IMAGE OF AN ENVIRONMENT OF A MOBILE APPARATUS AND MOTOR VEHICLE WITH SUCH A DEVICE

(71) Applicant: Volkswagen Aktiengesellschaft, Wolfsburg (DE)

(72) Inventors: Toni Günther, Braunschweig (DE); Robin Wehner, Berlin (DE); Sven Horstmann, Berlin (DE); Sönke Freter, Berlin (DE); Dean Elliott, Hannover (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 134 days.

(21) Appl. No.: 16/576,737

(22) Filed: Sep. 19, 2019

(65) Prior Publication Data

US 2020/0098270 A1    Mar. 26, 2020

(30) Foreign Application Priority Data

Sep. 21, 2018  (DE) ............... 10 2018 216 110.0

(51) Int. Cl.
*G08G 1/16* (2006.01)
*G06K 9/00* (2006.01)

(52) U.S. Cl.
CPC ......... *G08G 1/166* (2013.01); *G06K 9/00791* (2013.01)

(58) Field of Classification Search
CPC ............. G08G 1/166; G06K 9/00791
See application file for complete search history.

(56) References Cited

U.S. PATENT DOCUMENTS

| 2011/0106446 A1* | 5/2011 | Waeller ................ B60K 35/00 701/533 |
| 2011/0246156 A1 | 10/2011 | Zecha et al. ................... 703/6 |

(Continued)

FOREIGN PATENT DOCUMENTS

| DE | 102008036009 A1 | 10/2009 | ............ B60W 30/06 |
| DE | 102008062916 A1 | 6/2010 | ............ B60W 30/08 |

(Continued)

OTHER PUBLICATIONS

McAllister, Rowan et al., "Concrete Problems for Autonomous Vehicle Safety: Advantages of Bayesian Deep Learning," Proceedings of the 26th International Joint Conference on Artificial Intelligence, pp. 4745-4753, Aug. 1, 2017.

(Continued)

*Primary Examiner* — Joseph H Feild
*Assistant Examiner* — Sharmin Akhter
(74) *Attorney, Agent, or Firm* — Slayden Grubert Beard PLLC

(57) ABSTRACT

The invention relates to a method for providing an environmental image of an environment of a mobile apparatus, comprising the following steps: Receiving and/or recording environmental data using an input apparatus, wherein the environmental data image the environment and comprise information on static objects and/or dynamic objects in the environment, executing the following steps for a current and for at least one future point in time by means of an estimating apparatus: estimating a state probability distribution for at least one of the static objects and/or dynamic objects based on the received and/or recorded environmental data, creating a risk potential field map of the environment based on the estimated state probability distribution of the at least one static object and/or dynamic object, wherein this is done taking into account at least one potential risk enhance- (Continued)

ment, and combining the risk potential field maps into a risk potential field map sequence, and outputting the risk potential field map sequence. The invention further relates to an associated device and a motor vehicle.

17 Claims, 5 Drawing Sheets

(56) References Cited

U.S. PATENT DOCUMENTS

| | | | | |
|---|---|---|---|---|
| 2012/0330541 A1* | 12/2012 | Sakugawa | ............... | G08G 1/166 |
| | | | | 701/301 |
| 2015/0344030 A1* | 12/2015 | Damerow | ......... | B60W 30/0956 |
| | | | | 701/1 |
| 2017/0161614 A1* | 6/2017 | Mehta | .................... | G06N 20/00 |

FOREIGN PATENT DOCUMENTS

| | | | | |
|---|---|---|---|---|
| DE | 102011078615 A1 | 1/2013 | ............ | B60W 30/08 |
| DE | 102013202463 A1 | 8/2014 | ............ | B60W 30/08 |
| DE | 102015206335 A1 | 10/2016 | ............ | B60W 50/14 |
| DE | 102016212700 A1 | 1/2018 | ............ | B60W 30/08 |

OTHER PUBLICATIONS

Extended European Search Report, Application No. 19193043.7, 9 pages, dated Feb. 12, 2020.
German Office Action, Application No. 102018216110.0, 6 pages, dated Mar. 14, 2019.

* cited by examiner

METHOD AND DEVICE FOR PROVIDING AN ENVIRONMENTAL IMAGE OF AN ENVIRONMENT OF A MOBILE APPARATUS AND MOTOR VEHICLE WITH SUCH A DEVICE

CROSS-REFERENCE TO RELATED APPLICATIONS

This application claims priority to German Patent Application No. DE 10 2018 216 110.0, filed on Sep. 21, 2018 with the German Patent and Trademark Office. The contents of the aforesaid patent application are incorporated herein for all purposes.

TECHNICAL FIELD

The invention relates to a method and a device for providing an environmental image of an environment of a mobile apparatus. Furthermore, the invention relates to a motor vehicle comprising such a device.

BACKGROUND

Modern motor vehicles have a plurality of assistance systems that help a driver with driving. For example, such an assistance system can be a park assist, a lane departure warning system, or a cruise control. Furthermore, assistance systems are known that can drive the vehicle in a semi-automated or automated manner, i.e., partially or fully assume both longitudinal as well as transverse control of the motor vehicle.

A method for protecting a motor vehicle from collision and a parking garage assist is known from DE 10 2008 036 009 A1. In particular, a method to protect a vehicle from a collision within a parking garage and a maneuvering range are described, wherein the vehicle has an environmental sensor system to detect objects in the environment. The method comprises the following steps: Recording the sensor information from the environmental sensor system of the vehicle, creating a map of the environment from the sensor information from the environmental sensor system, determining the vehicle's own movement, and determining the probability of the vehicle colliding with objects in the environment of the vehicle based on the map of the environment and taking into account the vehicle's own movement.

From DE 10 2013 202 463 A1, a method is known for ascertaining a movement model of a dangerous road user. In this case, it is ascertained whether a dangerous road user is located in an environment of the vehicle. If it is determined that a dangerous road user is located in the environment of the vehicle, the position of the dangerous road user is ascertained. Furthermore, influential movement variables are ascertained that are representative of a given situation, and/or a given device, and/or a given significant point that can have an influence on a movement of the detected dangerous road user. Depending on the ascertained influential movement variables and the ascertained position of the dangerous road user, the movement model of the dangerous road user is ascertained, by means of which a predicted position of the dangerous road user can be ascertained.

DE 10 2011 078 615 A1 discloses an object detection device. A recorded image of a scene around a dedicated vehicle, information that indicates a state of the dedicated vehicle, and information that indicates an environmental situation around the dedicated vehicle are acquired in the object detection device; risk areas in which an object probably exists and degrees of risk of the risk areas are estimated based on the acquired information; degrees of risk of corresponding positions are estimated based on a relationship between each of the risk areas and the positions of the object that is assumed to exist in the risk area; a window image is extracted from a search area in the recorded image that corresponds to each of the risk areas according to a descending sequence of overall degrees of risk; and it is identified whether the window image is an image that shows the object by comparing an identification model with the window image.

A method for warning a road user and/or driver of a motor vehicle is known from DE 10 2015 206 335 A1 and has the following steps: Driving with a motor vehicle on a road; monitoring a first area that is located next to the road and that is intended not to be driven on by a motor vehicle by means of at least one sensor that is arranged in or on the motor vehicle; recording a hazardous site in the first area; ascertaining whether the hazardous site could cause a road user in the first area to move onto the road and whether the road user in the first area could fall due to the hazardous site; and/or ascertaining whether the hazardous site could significantly impair the comfort of the road user in the first area; and ascertaining the location and type of the hazardous site.

A method for controlling a vehicle is known from DE 10 2016 212 700 A1 having the steps: When the vehicle approaches a given location, providing to a vehicle control unit a local model that images typical behavior of a dangerous road user at a given location, determining a context in which the dangerous road user is momentarily located, wherein the context is formed from measured values from detecting the environment relative to the dangerous road user, ascertaining a prediction of the behavior of the dangerous road user with the local model using the context determined, and determining a reaction to the ascertained prediction in the control unit of the vehicle. Furthermore, a corresponding system for performing the method and a correspondingly equipped vehicle are known from the document.

A method is known from DE 10 2008 062 916 A1 for ascertaining a probability of a collision of a vehicle with a living being in which the spatiotemporal behavior of the living being is modeled with a behavioral model, and the spatiotemporal behavior of the vehicle is modeled with a kinematic model, and at least one trajectory is determined using the current positions of the vehicle and the living being. In this case, starting with the current positions of the living being and the vehicle, a trajectory of the vehicle and the living being is calculated as a trajectory pair until either the trajectory pair indicates a collision or does not indicate a collision; subsequently, the number of trajectory pairs that indicate a collision is ascertained, and from this the collision probability is calculated as a quotient from the number of trajectory pairs that indicate a collision, and the overall number of calculated trajectory pairs.

SUMMARY

In order to be able to provide assistance functions of the aforementioned type, the motor vehicle requires an excellent image of the environment. On the basis of such an environmental image, a planning apparatus may then plan a future trajectory that can be traveled partially automatically or automatically by the motor vehicle.

An object thus exists to provide a method and a device for providing an environmental image of an environment of a mobile apparatus in which the environmental image can be better provided.

The object is solved by means of a method and a device having the features of the independent claims. Embodiments of the invention are described in the dependent claims, the following description, and the figures.

In one aspect, a method for providing an environmental image of an environment of a mobile apparatus is provided which comprises the following steps: receiving and/or recording environmental data using an input apparatus, wherein the environmental data image the environment and comprise information on static objects and/or dynamic objects in the environment, executing the following steps for a current and for at least one future point in time using an estimating apparatus:
(a) estimating a state probability distribution for at least one of the static objects and/or dynamic objects based on the received and/or recorded environmental data,
(b) creating a risk potential field map of the environment based on the estimated state probability distribution of the at least one static object and/or dynamic object, taking into account at least one potential risk enhancement, combining the risk potential field maps of the environment for the current time and the at least one future point in time into a risk potential field map sequence, and outputting the risk potential field map sequence as an environmental image using an output apparatus.

The above and other aspects, features, and advantages will in the following be described using various embodiments.

BRIEF DESCRIPTION OF THE DRAWINGS

In the FIGS..

DETAILED DESCRIPTION

Figure 1:
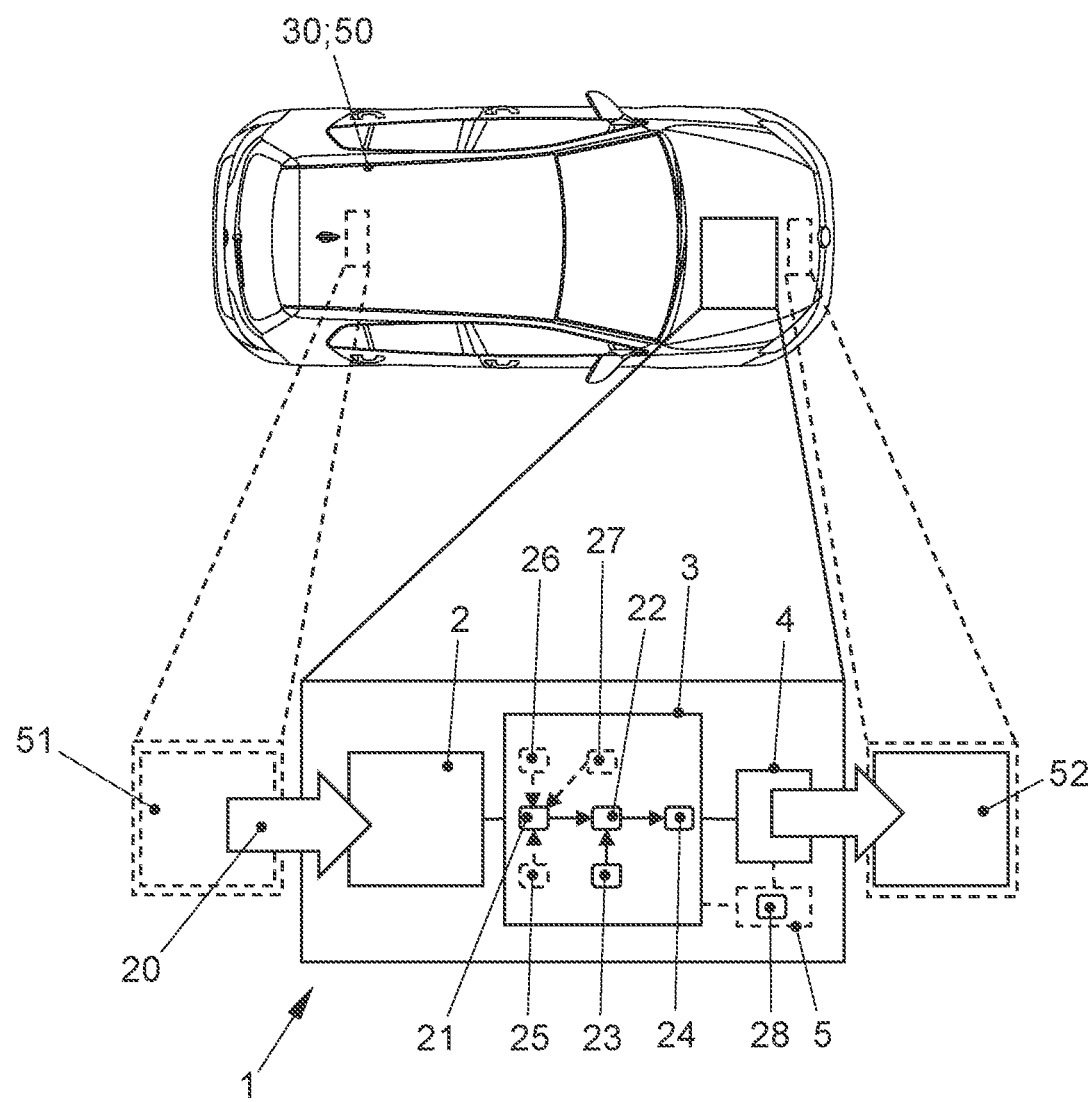
FIG. 1 shows a schematic representation of an embodiment of the device for providing an environmental image of an environment of a mobile apparatus.

In one aspect, a method for providing an environmental image of an environment of a mobile apparatus is provided which comprises the following steps:
receiving and/or recording environmental data using an input apparatus, wherein the environmental data image the environment and comprise information on static objects and/or dynamic objects in the environment,
executing the following steps (a) and (b) for a current and for at least one future point in time by means of an estimating apparatus:
  (a) estimating a state probability distribution for at least one of the static objects and/or dynamic objects based on the received and/or recorded environmental data,
  (b) creating a risk potential field map of the environment based on the estimated state probability distribution of the at least one static object and/or dynamic object, wherein this is done taking into account at least one potential risk enhancement,
combining the risk potential field maps of the environment for the current time and the at least one future point in time into a risk potential field map sequence, and
outputting the risk potential field map sequence as an environmental image by means of an output apparatus.

Furthermore and in a second aspect, a device is provided for providing an environmental image of an environment of a mobile apparatus comprising an input apparatus, wherein the input apparatus is designed to receive and/or record environmental data, wherein the environmental data image the environment and comprise information on static objects and/or dynamic objects in the environment, an estimating apparatus, wherein the estimating apparatus is designed to execute the following steps for a current and for at least one future point in time:
  (a) estimating a state probability distribution for at least one of the static objects and/or dynamic objects based on the received and/or recorded environmental data,
  (b) creating a risk potential field map of the environment based on the estimated state probability distribution of the at least one static object and/or dynamic object, wherein this is done taking into account at least one potential risk enhancement.

The estimating apparatus may furthermore be designed to combine the risk potential field maps of the environment for the current and the at least one future point in time into a risk potential field map sequence. The device may furthermore comprise an output apparatus, wherein the output apparatus is designed to output the risk potential field map sequence as an environmental image.

According to a third aspect, a motor vehicle is provided, comprising the device according to the preceding aspect.

A basic concept of the preceding aspects is to provide an improved environmental image of an environment of a mobile apparatus. In some embodiments, a risk potential field map is created by means of an estimating device both for a current time as well as for at least one future point in time based on environmental data of the environment of the mobile apparatus received and/or recorded by means of an input apparatus. The risk potential field map may indicate the spatially-resolved risk of meeting an object in the environment of the mobile apparatus. The risk potential field map may be created in this case taking into account at least one potential risk enhancement. The potential risk enhancement weights a previously estimated state probability distribution of a static and/or dynamic object, or indicates a potential risk as a constant for an area. Additional information on the environment may thereby be incorporated in the risk potential field map that can influence individual areas in the risk potential field map with respect to a predominant risk potential at that location. Accordingly, by means of the at least one potential risk enhancement, an area may be marked as risk-free in the risk potential map because no dynamic objects can be found there. In another case, a risk potential of an area in the risk potential field map may be increased when this area is passed very frequently by dynamic objects, and the probability of meeting a dynamic object there is therefore greater. The risk potential field maps for the current time and the at least one future point in time may then be combined by the estimating apparatus into a risk potential field map sequence, i.e., the risk potential field maps exist as a bundle. The combined risk potential field map sequence may then output by an output apparatus.

A benefit of the arrangement according to the preceding aspects is that an improved environmental image can be provided, wherein additional information about the environment can be taken into account by means of the potential risk enhancement when creating the environmental image.

The mobile apparatus may in some embodiments be a motor vehicle. However, the mobile apparatus may in some embodiments also be an industrial robot, such as a transport robot, a lawnmower, or another land vehicle, watercraft, or aircraft.

The received or detected environmental data may in some embodiments for example be sensor data from any known sensor such as radar, ultrasound, LIDAR, cameras, stereo cameras, etc. to provide the environmental data. Furthermore, the environmental data may in some embodiments also originate from other mobile apparatuses such as from other motor vehicles or a traffic control system. The received and/or detected environmental data may in some embodiments comprise information on the sensors used for detection, such as a type of sensor, a sensor resolution or a sensor quality, etc.

The received and/or detected environmental data may in some embodiments comprise at least position information on static objects and/or dynamic objects in the environment of the mobile apparatus. Static objects may in some embodiments be objects that are immobile such as buildings or permanently installed traffic infrastructure. A static object may, however for example also be a parked motor vehicle. Dynamic objects may in some embodiments be vehicles on a road such as motor vehicles or bicycles, pedestrians on a sidewalk or in a lane of a road, for example in a crosswalk.

The received and/or detected environmental data may in some embodiments comprise additional information, such as directional information, speed information, acceleration information, or information on the class of the static object and/or dynamic object. Furthermore, the received and/or detected environmental data may also comprise additional information on the state of the static object and/or dynamic object, for example a switching state at a stoplight (red, yellow, green), or a state of the brake lights and/or the turn signal in the motor vehicle. To accomplish this, it may in some embodiments be provided that a pattern recognition and/or classification of the static objects and/or dynamic objects in the environment of the mobile apparatus is performed, and the results are provided as environmental data. The received and/or detected environmental data may in some embodiments also comprise information on an environmental state of the environment such as weather information (rain, clouds, snow, sunshine, etc.), or a traffic state (jam, etc.).

In some embodiments, the environmental data have been fused from sensor data and already comprise the position, speed and direction as well as the class (such as building, traffic light system, motor vehicle, bicycle, pedestrian) etc. for the objects in the environment.

The estimating apparatus in some embodiments estimates a state probability distribution for at least one of the static objects and/or dynamic objects based on the received and/or recorded environmental data. This may be accomplished for example in that a Gaussian normal distribution is assumed for the position of a static object and/or dynamic object, wherein the position information forms the expected value, and a standard deviation is derived for example from a sensor quality of the sensor used to record the environmental data. Furthermore, a property of the object, such as an extent can also be taken into account.

The state probability distribution for the at least one static and/or dynamic object may in some embodiments comprise occupancy information, i.e., information on whether or not the object can be found at the corresponding position, such as in the form of an existence probability distribution. Furthermore, the state probability distribution for the at least one static and/or dynamic object may in some embodiments also comprise risk information assigned to the respective object and its position, i.e., information on the risk associated with the respective object for the mobile apparatus, for example in the form of a risk probability distribution.

For the at least one future point in time, the position of a dynamic object is no longer precisely known, so that the uncertainty of the position is correspondingly increased. This may, e.g., be taken into account in some embodiments while estimating, for example in that the expected value is correspondingly estimated for the at least one future point in time, for example on the basis of a speed of the object, and the standard deviation is increased corresponding to the greater uncertainty. For additional future points in time, the uncertainty increases further, which is correspondingly taken into account while estimating.

In some embodiments, a state probability distribution for all of the static objects and/or dynamic objects depicted in the environmental data is estimated so that all of the objects located in the environment can be taken into account in the risk potential field map and the risk potential field map sequence.

The risk potential field map may be a map of the environment in which a risk value is saved at each position of the map that indicates how probable it is of meeting another, e.g., dynamic object there. If risk values can be assumed, for example a value within a range between 0 and 1, the value 0 at a position in the risk potential field map means that an object will not be encountered there. The value 1 contrastingly means that an object is to be encountered there. Such a risk potential field map may for example comprise a range of 50 m×50 m, 20 m×20 m, or only 10 m×10 m as well. The risk potential field map may in some embodiments be designed in a grid, i.e., it consists of individual grid elements or cells arranged in a grid that are each assigned a risk value.

In some embodiments, properties of the environment are considered a potential risk enhancement. This may for example be the information on the quality of the environment such as a road layout, traffic rules, etc. For example, a crosswalk can be assigned such potential risk enhancement since the probability of a dynamic object, in this case a pedestrian, being on the crosswalk is greater than the probability of the pedestrian being on the road. The potential risk enhancements may be provided based on a map, for example a road map enriched with additional information. In this manner, positions of crosswalks in the environment may be ascertained which are then assigned a corresponding potential risk enhancement.

A potential risk enhancement may be considered as a weighting factor for the state probability distribution, or as a fixed constant when creating the risk potential field map. It may in according embodiments be provided that an estimated state probability distribution is weighted using a potential risk enhancement. In other embodiments, it can be provided that a certain location, or respectively area in the risk potential field map is assigned a constant risk value, or respectively risk potential independent of a state probability distribution of an object. Accordingly, for example a crosswalk on which a pedestrian is located can be generally assigned a constant risk value of 0.5. If instead a state probability distribution of a pedestrian overlaps with the area of the crosswalk, the area of the crosswalk is assigned a constant risk value of 1.

In the case of a potential risk enhancement used for weighting, the following factors may for example be provided with which a state probability distribution of an object is weighted:
- a pedestrian on the road factor of 0.5
- a pedestrian on the sidewalk factor of 1
- a motor vehicle on the road factor of 1
- a motor vehicle on the sidewalk factor of 0 (=parked motor vehicle)

In some embodiments, the individual constants or respectively weighting factors for the potential risk enhancement are saved in a database from which they are requested as needed. This may be done in particular depending on a roadmap and/or classes that are or will be assigned to the static or dynamic objects in the environmental data. Potential risk enhancements may also be archived for different situations. For example, the potential risk enhancement can be selected differently in otherwise equivalent conditions depending on the weather.

In particular, certain natural behaviors observed in people when driving a mobile apparatus, in particular a motor vehicle can be taken into account by the potential risk enhancement. For example, certain areas or certain objects in the environment may be provided with a potential risk enhancement. If the environment is for example a 30-mile-an-hour zone in which a motor vehicle is traveling as a mobile apparatus, and if additional motor vehicles are parked perpendicular to the right of the motor vehicle, the driver of the motor vehicle will allow more space when driving around another large parked motor vehicle, for example a large truck whose rear part extends far into the road than other smaller motor vehicles that are only in parking spaces next to the road since the driver cannot see the area behind the truck as well and therefore estimates the risk to be higher. Correspondingly, a potential risk enhancement may, e.g., be selected in this situation that factors in this human behavior, i.e., the area in which the truck is located is weighted with a higher factor than the areas in which the smaller other motor vehicles are located. Furthermore, the factor can also vary with a distance to an object, in particular, the factor can increase at a greater distance. The farther away an object is, for example a parked vehicle that covers an area to the rear, the greater the estimated risk. This allows an uncertainty which increases with a greater distance to be taken into account.

In some embodiments, a visual obstruction, i.e., an area that cannot be seen, can be better taken into account by the potential risk enhancement. Such a visual obstruction can for example be caused by a parked vehicle, buildings or other objects, etc.

The at least one potential risk enhancement is derived from the received and/or recorded environmental data, for example by means of the estimating apparatus, and/or requested from a database on the basis of the received and/or recorded environmental data.

The output risk potential field map sequence is in some embodiments supplied to a planning apparatus of the mobile apparatus which performs trajectory planning on the basis of the risk potential field map sequence, i.e., plans the future behavior, or respectively the future movement of the mobile apparatus. Expressed simplified, the planning apparatus then plans the trajectory of the mobile apparatus so that areas with a high risk value, or respectively high risk potential are avoided if possible, and the trajectory lies in areas that have a low risk value, or respectively a low risk potential.

In some embodiments, the method is repeated at other future points in time so that an updated risk potential field map sequence can always be provided in which the estimated future behavior of dynamic objects is updated continuously in the environment of the mobile apparatus.

In some embodiments, it is provided that degrees of freedom of the at least one static object and/or dynamic object are taken into account when estimating the state probability distribution. If a dynamic object is for example another motor vehicle waiting at an intersection, the motor vehicle can leave the intersection in three possible directions (straight ahead, turning right and turning left). This may be taken into account for the future points in time when estimating the state probability. Accordingly, the state probability distribution may be configured for the future point in time corresponding to the three possible directions. If, for example, in another case a left turn is forbidden for the other vehicle at such an intersection, this can be directly taken into account in the state probability distribution or in the form of a potential risk enhancement. A risk value in the risk potential map may then be reduced correspondingly for a left turn by the other motor vehicle, i.e., the probability that the other motor vehicle will be encountered at a future point in time in the relevant area is reduced. In the device, the estimating apparatus may correspondingly be configured to take into account the degrees of freedom when estimating the state probability distribution.

Some embodiments provide that information on intent of at least one static object and/or dynamic object imaged in the environmental data is ascertained from the received and/or recorded environmental data, wherein the state probability distribution is also estimated for the at least one static object and/or dynamic object on the basis of the ascertained information on intent. This may significantly improve the estimation of the state probability distribution, e.g., for the at least one future point in time. If a considered dynamic object is for example another motor vehicle waiting at an intersection with an active left signal light, the probability may be increased that the vehicle will be correspondingly located on the part of the intersection to the left of the vehicle at a future point in time. In contrast, the probability may be reduced that the other motor vehicle will be located on the part of the intersection to the right of the vehicle, or on the section of the intersection lying in front of the other motor vehicle. When estimating the state probability distribution, this is correspondingly taken into account for the other motor vehicle. Information on intent may for example also comprise information on a direction of movement and/or a viewing direction, or a gesture by a pedestrian. In the case of other motor vehicles, information on intent also includes a state of brake lights, or a viewing direction, or a gesture by a driver of the other motor vehicle in addition to an active signal light. In the device, an intent recognition apparatus may be provided for this that is designed to execute this method step.

Some embodiments provide that the risk potential field map sequence is output as a film sequence consisting of individual images. Expressed otherwise, any risk potential field map contained in the risk potential field map sequence may be considered a bitmap graphic in which a single pixel corresponds to a risk value for the position in the environment corresponding to the pixel. The values may for example be encoded as grayscale values and can lie between 0 and 255.

In alternative embodiments to the aforementioned embodiments, the risk potential field map sequence is output as a quantity of individual grid elements of assigned time-dependent functions. Such a function may for example be a polynomial or a spline function. This makes it possible to easily generate time-dependent intermediate values for the risk values in the risk potential field map.

Some embodiments provide that a road graph is taken into account when estimating the state probability distribution. Such a road graph represents a quantity of roads and the connections existing between these roads. For example, a future direction of movement of another motor vehicle may be better estimated based on the road graph since the direction in which the other motor vehicle can move, or respectively is allowed to move may be derived from the road graph. It is therefore possible to estimate the state probability distribution more easily. In the device, the estimating apparatus is correspondingly designed for this.

Some embodiments provide that areas covered in the environmental data by static objects and/or dynamic objects are identified, and at least one potential risk enhancement is assigned to these identified areas. A covered area may be an area in this case that cannot be recorded by the sensors that have recorded, or respectively provided the environmental data due to its position. Since a statement on the existence of static objects and/or dynamic objects is impossible in these covered areas, a potential risk enhancement is assigned to these areas so that they may still be considered in the risk potential field map. Accordingly, covered regions can for example be assigned general risk values of 0.5 if the risk values in the risk potential field map lies within the range between 0 and 1. A planning apparatus involved with trajectory planning can then avoid these covered areas until environmental data are available about these areas. In the device, the estimating apparatus correspondingly may be designed for this in some embodiments.

Some embodiments provide deriving a recommended action for the mobile apparatus by means of a recommendation apparatus based on at least one of the risk potential field maps, or the risk potential field map sequence, and outputting it by means of the output apparatus. For example, such a recommended action may be a recommendation to reduce a speed, or to perform an emergency stop. The device in this case comprises a correspondingly designed recommendation apparatus.

In some embodiments, parts of the device may be formed individually or assembled as a combination of hardware and software, for example as programmed code that is executed in a micro-controller or a microprocessor.

In the following, the invention will be explained in greater detail based on further exemplary embodiments and with reference to the drawings.

FIG. 1 shows a schematic representation of an embodiment of the device 1 for providing an environmental image of an environment of a mobile apparatus 30. The mobile apparatus 30 is a motor vehicle 50 in the shown embodiment. In principle, the mobile apparatus 30 can however also be designed differently, for example as a transport robot.

The device 1 comprises an input apparatus 2, an estimating apparatus 3 and an output apparatus 4. The input apparatus 2 is designed to receive and/or record environmental data 20, wherein the environmental data 20 depict the environment and comprise information on static objects and/or dynamic objects in the environment. The environmental data 20 are provided by environmental sensors 51 of the motor vehicle 50. These can for example be radar sensors, ultrasonic sensors, LIDAR sensors, cameras and/or stereo cameras, etc. Sensor data fusion for supplying the environmental data 20 can also be provided. The environmental data 20 can comprise additional information depicting the environment such as directional information, speed information and/or acceleration information of the objects, and/or class information on the class of the static objects and/or dynamic objects. Furthermore, the received and/or detected environmental data 20 can also comprise additional information on the state of the static object and/or dynamic object, for example a switching state of a stoplight (red, yellow, green), or a state of the brake lights and/or the turn signal of another motor vehicle. To accomplish this, it can be provided that a pattern recognition and/or classification of the static objects and/or dynamic objects is performed, and the results are provided as environmental data 20. The received and/or detected environmental data 20 can also comprise information on an environmental status of the environment such as weather information (rain, clouds, snow, sunshine, etc.), or a traffic status.

The received and/or recorded environmental data 20 are supplied to the estimating apparatus 3. The estimating apparatus 3 is designed to perform the following steps for a current and for at least one future point in time:

(a) estimating a state probability distribution 21 for at least one of the static objects and/or dynamic objects based on the received and/or recorded environmental data 20, (b) creating a risk potential field map 22 of the environment based on the estimated state probability distribution 21 of the at least one static object and/or dynamic object, wherein this is done taking into account at least one potential risk enhancement 23.

The estimation apparatus 3 performs these steps, e.g., for all static objects and/or dynamic objects contained in the environmental data 20. Beneficially, the estimating apparatus 3 performs the steps for additional future points in time so that future behavior of the objects can be predicted.

The estimating apparatus 3 is furthermore designed to combine the risk potential field maps 22 of the environment for the current and the at least one future point in time into a risk potential field map sequence 24.

The risk potential field map sequence 24 is supplied to the output apparatus 4 that then outputs this as a current environmental image, for example to a planning apparatus 52 of the motor vehicle 50. The planning apparatus 52 then plans a future trajectory of the motor vehicle 50 based on the output risk potential field map sequence 24.

For example, the method is repeated by the device 1 at the next point in time. In this manner, a continuously updated environmental image can be provided in which the future behavior of objects is always estimated based on currently received and/or recorded environmental data 20.

In some embodiments, it may be provided that degrees of freedom 25 of the at least one static object and/or dynamic object are taken into account when estimating the state probability distribution 21.

It can furthermore be provided that the estimating apparatus 3 ascertains information on intent 26 of at least one static object and/or dynamic object imaged in the environmental data 20 ascertained from the received and/or recorded environmental data 20, wherein the state probability distribution 21 is also estimated for the at least one static object and/or dynamic object on the basis of the ascertained information on intent 26. The information on intent is for example ascertained and provided by an intention recognition apparatus of the device 1 (not shown).

It may be provided that the risk potential field map sequence 24 is output as a film sequence consisting of individual images. Alternatively to this, it may be provided that the risk potential field map sequence 24 is output as a quantity of individual grid elements of assigned time-dependent functions. The time-dependent functions can for example be polynomial or spline functions.

Furthermore, it may be provided that a road graph 27 is taken into account when estimating the state probability distribution 21. This can for example be archived in a memory (not shown), and be provided to the estimating apparatus 3 as needed. It may however also be provided that the road graph 27 is comprised by the environmental data 20.

It may be provided that areas covered in the environmental data 20 by static objects and/or dynamic objects are identified, and at least one potential risk enhancement 23 is assigned to each of these covered areas.

It may be provided that the device 1 comprises a recommending apparatus 5, wherein it derives a recommended action for the motor vehicle 50 based on at least one of the risk potential field maps or the risk potential field map sequence 24. The derived recommended action 28 is supplied to the output apparatus 4 and output thereby, for example to the planning apparatus 52 of the motor vehicle 50. For example, such a recommended action 28 can be a recommendation to reduce or increase a speed, or to perform an emergency stop.

Figure 2:
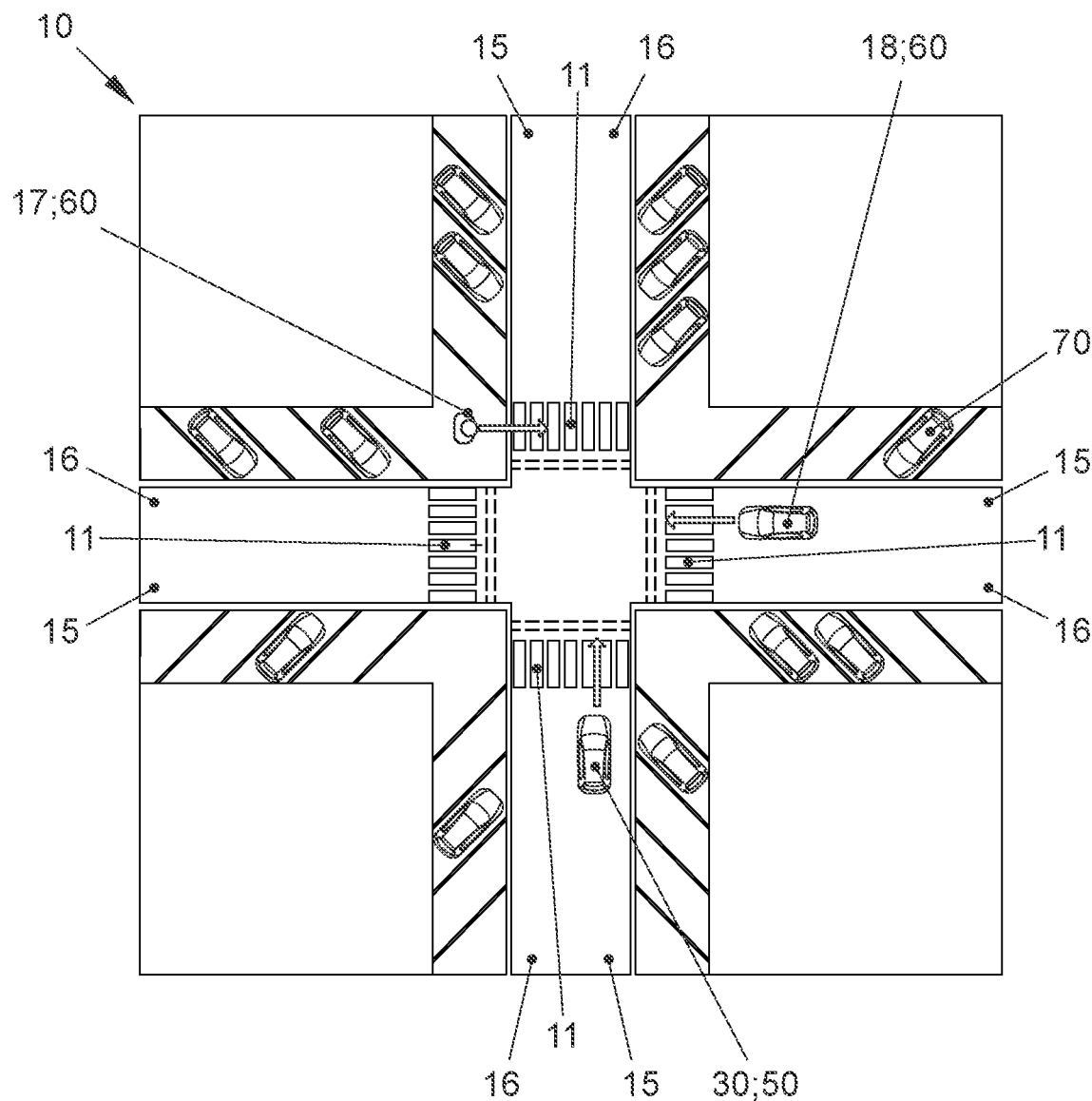
FIG. 2 shows a schematic representation of an environment of a motor vehicle.

FIG. 2 shows a schematic representation of an environment 10 of a motor vehicle 50 for illustration purposes. The environment 10 in the shown example is an intersection with four entrances 15 and four exits 16. Located in the environment 10 is a motor vehicle 50 as a mobile apparatus 30, a pedestrian 17 as a dynamic object 60, and another motor vehicle 18 as a dynamic object 60. Furthermore, the intersection includes a crosswalk 11 and parked motor vehicles in the environment 10 for each of the entrances 15, or respectively exits 16 (for the sake of clarity, only one has been provided with a reference sign).

As indicated by the arrows, the motor vehicle 50 and the other motor vehicle 18 are moving to the middle of the intersection. The pedestrian 17 is underway in the direction of the crosswalk 11.

Figure 3:
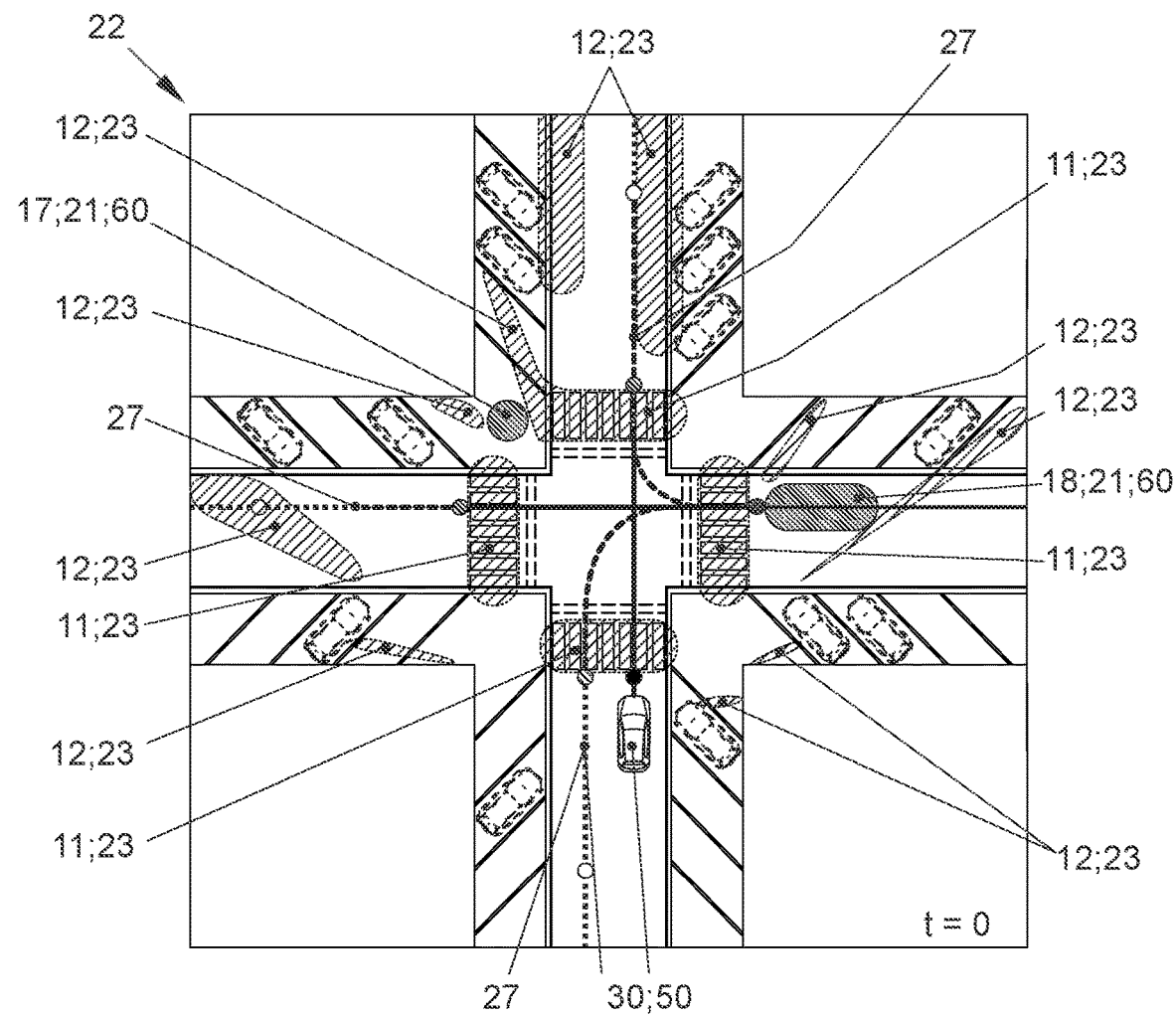
FIG. 3 shows a schematic representation of a potential field map derived from the environment shown in FIG. 2 for a current time t=0.

FIG. 3 shows a schematic representation of a risk potential field map 22 for a current point in time t=0 derived from the environment shown in FIG. 2. The risk potential field map 22 shows the time-resolved risk for the presence of an object 60 in the environment of the motor vehicle 50, i.e., risk potential fields are depicted in the environment of the motor vehicle 50. State probability distributions 21 are assigned to the other motor vehicle 18 and the pedestrian 17 as dynamic objects 60. Since flashing of the turn signal was not ascertained as information on intent from the other motor vehicle 18 in the received and/or recorded environmental data, the probability that the other motor vehicle 18 will continue to drive straight ahead is greater than it turning left or right. This is schematically represented by hatching of a varying intensity in the reduced road graph 27, wherein dark hatching stands for a greater probability, and light hatching, or respectively a white line, contrastingly stands for a lesser probability. Three degrees of freedom (drive straight ahead, turn left, turn right) of the additional motor vehicle 18 can be derived from the road graph 27.

The crosswalks 11 are marked with a potential risk enhancement 23 so that an increased risk value is there in the risk potential field in the risk potential field map 22. The risk potential field map 22 can also be considered a time-resolved cost map in which the locations with an elevated risk potential, or respectively extended areas in the form of risk potential fields are assigned greater cost in subsequent trajectory planning than areas with little or no risk potential. Areas 12 covered by buildings or parked motor vehicles 70 are also each assigned a potential risk enhancement 23 that each yield individual risk potentials, or respectively risk potential fields in the risk potential field map 22.

Figure 4:
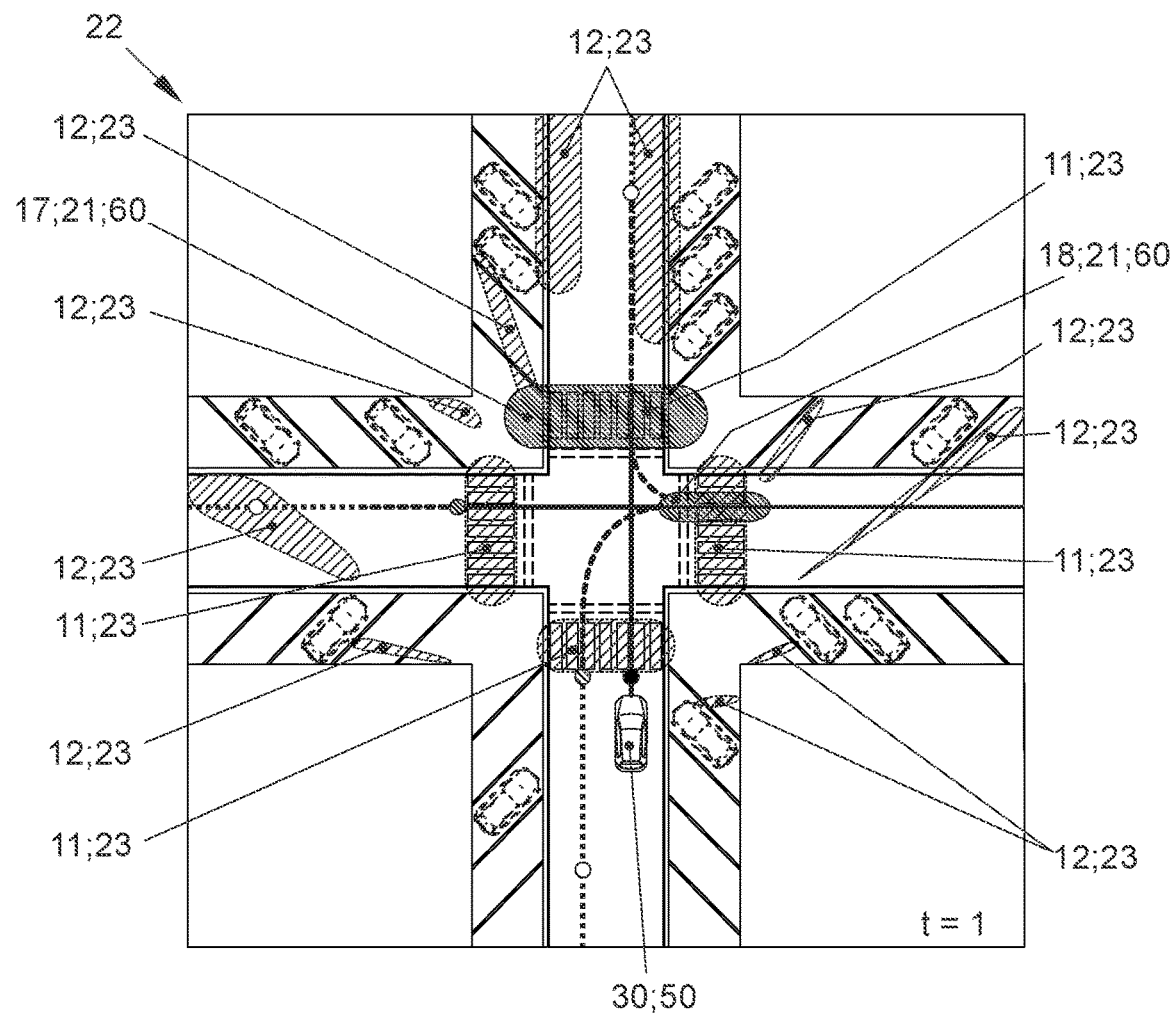
FIG. 4 shows a schematic representation of a potential field map derived from the environment shown in FIG. 2 for a future point in time t=1.

FIG. 4 shows a schematic representation of a risk potential field map 22 for a future point in time t=1 derived from the environment shown in FIG. 2 that was created by means of the estimating apparatus. It can clearly be seen that the area of the state probability distribution 21 for the pedestrian 17 has become larger in comparison to the risk potential field map 22 in FIG. 3 since the uncertainty in estimating the position of the pedestrian 17 at time t=1 has increased. This yields a corresponding risk potential field in the risk potential field map 22, wherein the state probability distribution 21 in the risk potential field map 22 is correspondingly weighted by the potential risk enhancement 23 of the crosswalk 11 lying in this area, in the simplest case with a factor of 1 (when the value range lies between 0 and 1), or respectively a factor of 100%.

Correspondingly, the state probability distribution 21 of the other motor vehicle 18 has become wider so that in this case as well, a correspondingly increased risk potential field is generated in the risk potential field map 22.

The other areas, or respectively risk potential fields are the same as those of the risk potential field map 22 shown in FIG. 3, i.e., the crosswalks 11 and the covered areas 12 yield unchanged risk potential fields in the risk potential field map 22. In addition, the probability of the direction in which the other motor vehicle 18 will continue to drive remains unchanged.

Figure 5:
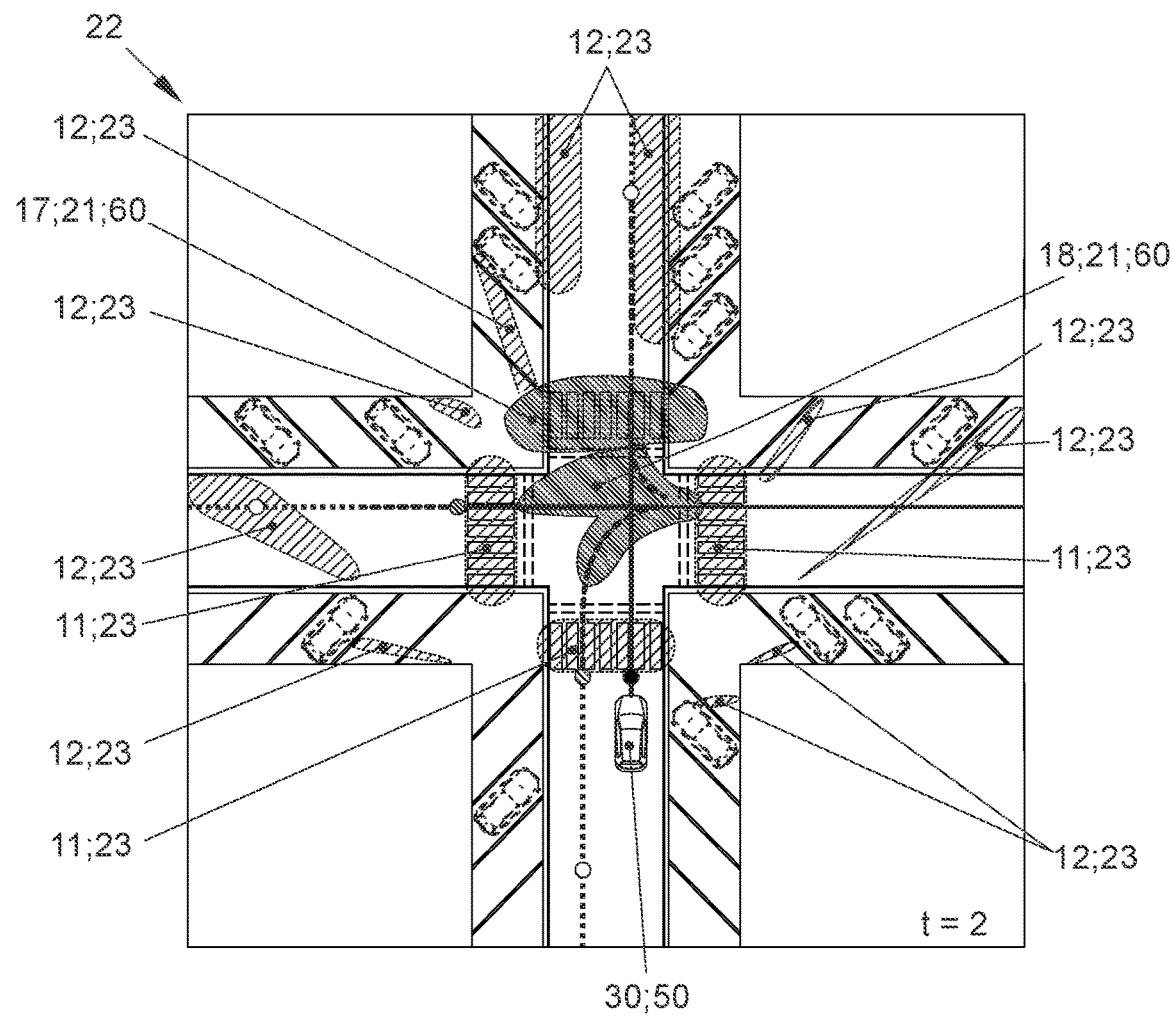
FIG. 5 shows a schematic representation of a potential field map derived from the environment shown in FIG. 2 for a future point in time t=2.

FIG. 5 shows a schematic representation of a risk potential field map 22 for a future point in time t=2 derived from the environment shown in FIG. 2 that was created by means of the estimating apparatus. It can clearly be seen that the area of the state probability distribution 21 for the pedestrian 17 has become larger since the uncertainty in estimating the position of the pedestrian 17 at the point in time t=2 has again increased. This yields a corresponding risk potential field in the risk potential field map 22, wherein the state probability distribution 21 in the risk potential field map 22 is correspondingly weighted by the potential risk enhancement 22 of the crosswalk 11 lying in this area, in the simplest case with a factor of 1 (when the value range lies between 0 and 1), or respectively a factor of 100%.

The area of the state probability distribution 21 of the other motor vehicle 18 has also increased and is now distributed in all three possible directions in which the other motor vehicle 18 can move according to its degrees of freedom. The corresponding potential field in the risk potential field map 22 is correspondingly distributed in three directions, wherein the probability of driving straight ahead in comparison to turning is increased further since the turn signal flashing was not recorded in the environmental data at the current point in time (t=0).

The other areas, or respectively risk potential fields have remained the same, i.e., the crosswalks 11 and the covered areas 12 yield unchanged risk potential fields in the risk potential field map 22. In addition, the probability of the direction in which the other motor vehicle 18 will continue to drive remains unchanged.

The risk potential field maps 22 shown in FIGS. 3 to 5 are combined by means of the estimating apparatus into a risk potential field sequence and output by means of the output apparatus. The risk potential field map sequence then comprises three risk potential field maps for the points in time t=0 to t=2.

At the point in time t=1, it can be provided that the method is repeated by means of the device 1, wherein updated environmental data are thereby taken into account. If a risk potential field map sequence comprises three risk potential field maps 22 at each point in time, then the next risk potential field map sequence comprises risk potential field maps 22 for the points in time t=1 to t=3, etc.

Based on the output risk potential field map sequences, a planning apparatus of the motor vehicle 50 can continuously perform current trajectory planning and better control the motor vehicle, or respectively better regulate its longitudinal and transverse guidance.

The exemplary embodiments consistently refer to a motor vehicle 50. The mobile apparatus 30 can however also be a transport robot or another vehicle that in particular is driven in an automated manner.

REFERENCE NUMBER LIST

1 Device
2 Input apparatus
3 Estimating apparatus
4 Output apparatus
5 Recommending apparatus
10 Environment
11 Crosswalk
12 Covered area
15 Entrance
16 Exit
17 Pedestrian
18 Other motor vehicle
20 Environmental data
21 State probability distribution
22 Risk potential field map
23 Potential risk enhancement
24 Risk potential field map sequence
25 Degree of freedom
26 Information on intent
27 Road graph
28 Recommended action
30 Mobile apparatus
50 Motor vehicle
51 Environmental sensors
52 Planning apparatus
60 Dynamic object
70 Parked motor vehicle The invention has been described in the preceding using various exemplary embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The mere fact that certain measures are recited in mutually different dependent claims or embodiments does not indicate that a combination of these measured cannot be used to advantage. Any reference signs in the claims should not be construed as limiting the scope.

What is claimed is:

1. A method for providing an environmental image of an environment of a mobile apparatus, comprising the following steps:
   receiving and/or recording environmental data imaging the environment and comprising information on static objects and/or dynamic objects in the environment;
   executing steps (a) and (b) for a current and for at least one future point in time using an estimating apparatus, wherein:
      step (a) includes estimating a state probability distribution for at least one of the static objects and/or dynamic objects based on the received and/or recorded environmental data,
      step (b) includes creating a risk potential field map of the environment based on the estimated state probability distribution of the at least one static object and/or dynamic object, taking into account at least one potential risk enhancement;
   combining the risk potential field maps of the environment for the current point in time and the at least one future point in time into a risk potential field map sequence; and
   displaying the risk potential field map sequence as an environmental image;
   wherein the risk potential field map sequence comprises a plurality of individual grid elements each having an assigned time-dependent function.

2. The method according to claim 1, wherein degrees of freedom of the at least one static object and/or dynamic object are taken into account when estimating the state probability distribution.

3. The method according to claim 2, wherein information on intent of at least one static object and/or dynamic object imaged in the environmental data is determined from the received and/or recorded environmental data, wherein the state probability distribution is also estimated for the at least one static object and/or dynamic object on the basis of the ascertained information on intent.

4. The method according to claim 2, wherein the risk potential field map sequence is output as a film sequence consisting of individual images.

5. The method according to claim 2, wherein the risk potential field map sequence is output as a number of individual grid elements of assigned time-dependent functions.

6. The method according to claim 2, wherein a road graph is taken into account when estimating the state probability distribution.

7. The method according to claim 1, wherein information on intent of at least one static object and/or dynamic object imaged in the environmental data is determined from the received and/or recorded environmental data, wherein the state probability distribution is also estimated for the at least one static object and/or dynamic object on the basis of the ascertained information on intent.

8. The method according to claim 7, wherein the risk potential field map sequence is output as a film sequence consisting of individual images.

9. The method according to claim 7, wherein a road graph is taken into account when estimating the state probability distribution.

10. The method according to claim 1, wherein the risk potential field map sequence is output as a film sequence consisting of individual images.

11. The method according to claim 10, wherein a road graph is taken into account when estimating the state probability distribution.

12. The method according to claim 1, wherein a road graph is taken into account when estimating the state probability distribution.

13. The method according to claim 1, wherein areas covered in the environmental data by static objects and/or dynamic objects are identified, and at least one potential risk enhancement is assigned to these identified covered areas.

14. The method according to claim 1, further comprising deriving a recommended action for the mobile apparatus using a recommendation apparatus based on at least one of the risk potential field maps or the risk potential field map sequence.

15. The method according to claim 1, wherein a road graph is taken into account when estimating the state probability distribution.

16. A device for providing an environmental image of an environment of a mobile apparatus comprising:
   an input configured to receive and/or record environmental data, wherein the environmental data image the environment and comprise information on static objects and/or dynamic objects in the environment;
   a processor programmed to execute the following steps for a current and for at least one future point in time:
   (a) estimating a state probability distribution for at least one of the static objects and/or dynamic objects based on the received and/or recorded environmental data,
   (b) creating a risk potential field map of the environment based on the estimated state probability distribution of the at least one static object and/or dynamic object, taking into account at least one potential risk enhancement;
   wherein the estimating apparatus is furthermore configured to combine the risk potential field maps of the environment for the current and the at least one future point in time into a risk potential field map sequence; and
   an output for displaying the risk potential field map sequence as an environmental image;
   wherein the risk potential field map sequence comprises a plurality of individual grid elements each having an assigned time-dependent function.

17. A motor vehicle comprising a device according to claim 16.

* * * * *